Feb. 3, 1942.   A. G. BLAIR   2,271,884
AUTOMOBILE TRAY DEVICE
Filed Aug. 27, 1940   2 Sheets-Sheet 2
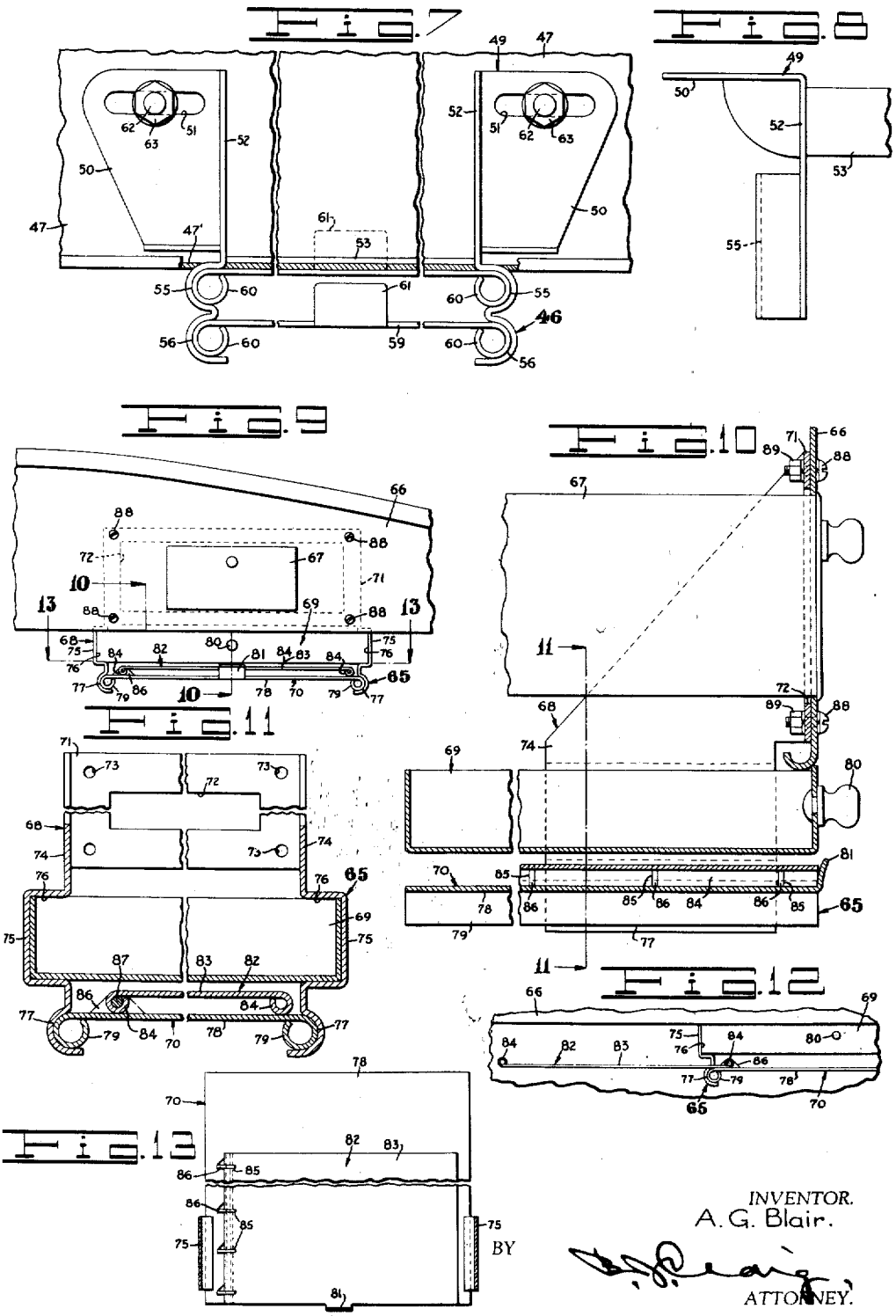
INVENTOR.
A. G. Blair.
BY
ATTORNEY.

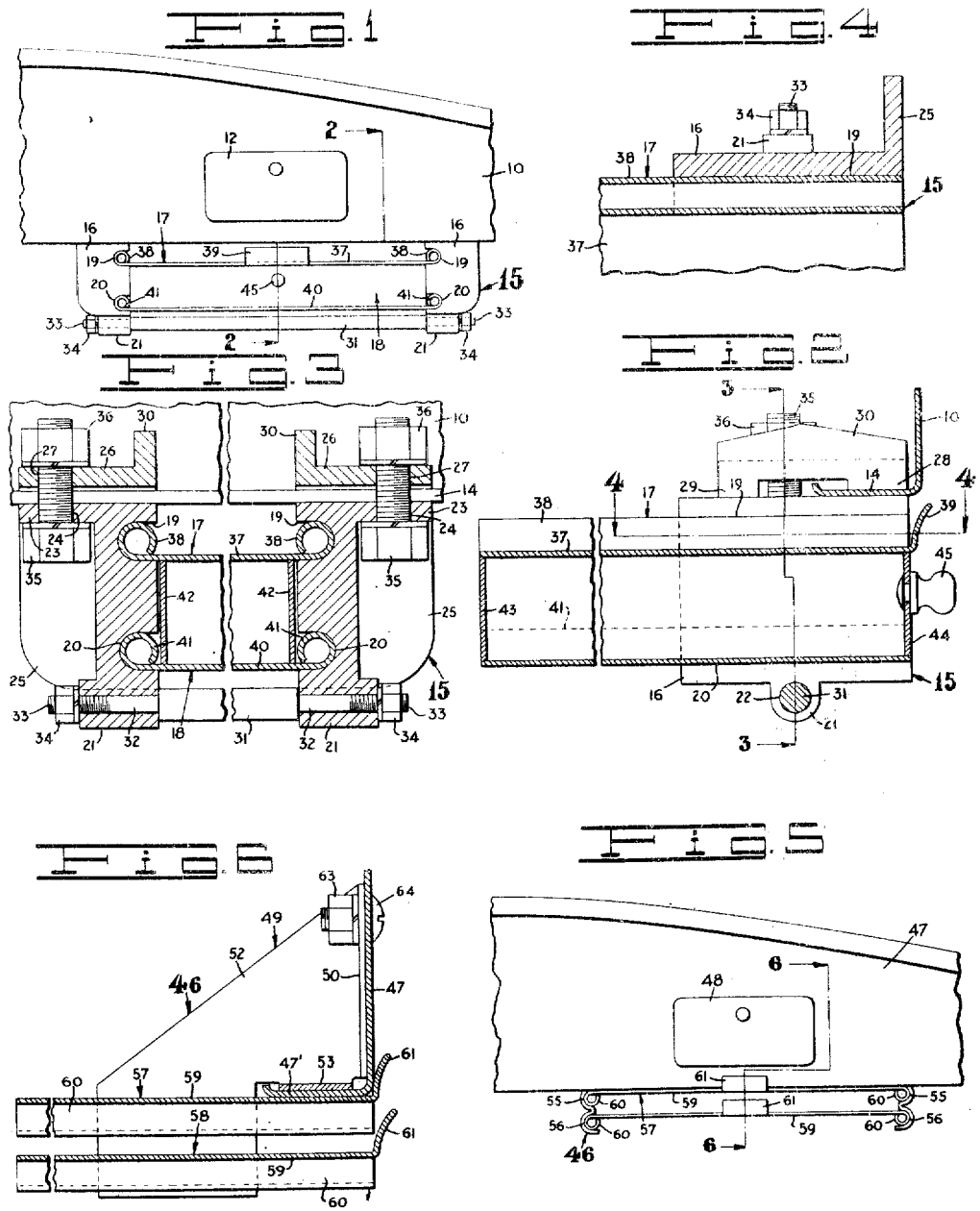

Patented Feb. 3, 1942

2,271,884

UNITED STATES PATENT OFFICE 2,271,884

AUTOMOBILE TRAY DEVICE

Alfred G. Blair, Pasadena, Calif.

Application August 27, 1940, Serial No. 354,379

2 Claims. (Cl. 311—21)

This invention relates to improvements in tray devices for installation in automobiles.

The general object of the invention is to provide a novel tray device for installation in the driver's compartment of an automobile.

Another object of the invention is to provide a novel mounting for a tray device.

A further object of the invention is to provide a novel tray device which can be conveniently mounted on the instrument panel of an automobile below the usual storage compartment of the instrument panel.

A still further object of the invention is to provide a tray device which is mounted on the instrument panel below the storage compartment and which includes tray means adapted to be moved into a convenient position for a person occupying the driver's seat.

Other objects and the advantages of this invention will be apparent from the following description taken in connection with the accompanying drawings, wherein:

Fig. 1 is a fragmentary face view of an automobile instrument panel showing my improved tray device operatively mounted thereon;

Fig. 2 is a fragmentary enlarged section taken on line 2—2, Fig. 1;

Fig. 3 is a fragmentary section taken on line 3—3, Fig. 2;

Fig. 4 is a fragmentary section taken on line 4—4, Fig. 2;

Fig. 5 is a fragmentary face view of an automobile instrument panel showing a modified form of my invention operatively mounted thereon;

Fig. 6 is a fragmentary enlarged section taken on line 6—6, Fig. 5;

Fig. 7 is a fragmentary rear view of the device shown in Fig. 6;

Fig. 8 is a fragmentary top plan view of the device shown in Fig. 7;

Fig. 9 is a fragmentary face view of an automobile instrument panel showing a further modified form of my invention operatively mounted thereon;

Fig. 10 is a fragmentary enlarged section taken on line 10—10, Fig. 9;

Fig. 11 is a fragmentary section taken on line 11—11, Fig. 10;

Fig. 12 is a view similar to Fig. 9 showing a portion of the device in an open position; and Fig. 13 is a fragmentary section taken on line 13—13, Fig. 9.

Referring to the drawings by reference characters I have indicated at 10, an instrument panel of an automobile which includes the usual storage compartment 12 and has an inturned flange 14 along the lower edge thereof.

I have indicated my improved tray device generally at 15 and show it as mounted on the instrument panel 10 below the storage compartment 12. As shown the device 15 includes spaced brackets 16 which slidably support a tray member 17 and a drawer member 18.

Each of the brackets 16 has a pair of horizontally directed, vertically spaced, grooves 19 and 20 therein and intermediate the length thereof below the lower groove 20 it includes a depending boss 21 having an aperture 22 therethrough at right angles to the grooves 19 and 20. Above the upper groove 19 and extending outwardly therefrom each of the brackets 16 includes a flange portion 23 having an aperture 24 therein (see Fig. 3). Furthermore each of the brackets 16 includes a front flange portion 25 which extends to the outer edge of the flange 23. Associated with each of the brackets 16 I provide a clamp member 26 having an aperture 27 therein and including depending foot portions 28 and 29 spaced each side of the aperture. Along the inner side thereof each of the clamps 26 includes an upwardly extending strengthening rib 30.

To correctly space the brackets 16 I may provide a spacer rod 31 having reduced end portions 32 which are positioned in the aperture 22 of the boss 21 of each of the brackets. The outer portions of each of the reduced ends 32 are threaded as at 33 to receive a nut 34.

To install the device 15 on the instrument panel 10 the upper faces of each of the brackets 16 is positioned against the lower face of the flange 14 and the foot 28 of the clamp 26 is positioned on the upper face of the flange 14 with the foot 29 engaging the upper surface of the bracket as clearly shown in Fig. 2. The shank of a bolt 35 is positioned in the aperture 24 of the bracket flange 23 and in the aperture 27 of the clamp 26.

A nut 36 on the bolt 35 when tightened against the clamp 26 firmly secures the clamp 26 to the bracket 16 thus firmly clamping the instrument panel 10 between the clamp foot 28 and the upper surface of the bracket.

The tray 17 comprises a flat metal plate 37 the edges of which are rolled inwardly to form a rolled edge bead 38 thereon. Intermediate the width thereof and extending upwardly from the front edge of the plate 37 the tray 17 includes a handle portion 39.

The side beads 38 of the tray 17 are positioned in the groove 19 of each of the brackets 16 and are slidable therein. The drawer 18 like the tray 17 includes a flat metal plate 40 the edges of which are rolled inwardly to form a rolled edge bead 41 thereon. Positioned on the plate 40 inwardly from the beads 41 and preferably secured thereto I provide spaced side members 42, a rear member 43 and a front member 44 having a suitable handle member 45 projecting outwardly therefrom.

The edge beads 41 of the drawer are positioned in the lower groove 20 of each of the brackets 16 and are slidable therein. The height of the drawer sides, back and front are preferably such that the plate portion 37 of the tray 17 forms a close fitting cover for the drawer 18.

In Figs. 5 to 8, inclusive, I have indicated a a modified form of my invention generally at 46 which like the device 15 is adapted to be mounted on an instrument panel 47 of an automobile below the storage compartment.

As shown the device 46 includes a support frame 49 made from a single sheet of metal and includes spaced securing brackets 50 each having an elongated aperture 51 therein adjacent the upper edge. Each of the brackets 50 includes a rearwardly extending portion 52. The portions 52 are connected by a transversely extending bar portion 53. At the rear of the bar 53 and therebelow each of the portions 52 is bent outwardly and inwardly to form an upper groove 55 and a lower groove 56.

The frame 49 is adapted to support a pair of tray members 57 and 58 each of which includes a flat body portion 59 rolled downwardly and inwardly at each edge to form a rolled edge bead 60.

The beads 60 of the tray 57 are positioned in the grooves 55 of the frame 49 and are slidable therein and the beads 60 of the tray 58 are positioned in the frame grooves 56.

Each of the trays 57 and 58 includes a handle portion 61 intermediate the width thereof along the front edge.

To install one of the devices 46 on an automobile the securing brackets 50 are positioned against the rear face of the instrument panel 47 with the connecting bar 53 resting on the upper surface of the inturned flange 47' of the instrument panel. Each of the brackets 50 is adapted to be secured to the instrument panel by a bolt 62 and a nut 63. The bolts are positioned in suitable apertures in the instrument panel 47 and in the elongated apertures 51 of the brackets.

In Figs. 9 to 13, inclusive, I have indicated a further modification of my invention generally at 65 which like the devices 15 and 46 is adapted to be mounted on an instrument panel 66 of an automobile below the usual storage compartment 67.

As shown the device 65 includes a frame 68 which supports a drawer member 69 and a tray member 70. The frame 68 is shown as made of a single piece of flat metal and includes a face plate 71 having a central aperture 72 and a plurality of spaced bolt receiving apertures 73 therein.

At each side of the face plate 71 the frame 68 includes a rearwardly and downwardly extending side portion 74 which projects below the face plate.

A predetermined distance below the face plate 71 each of the sides 74 includes an outwardly formed portion 75 which provides a groove 76 of sufficient height to receive the drawer 69. A predetermined distance below the groove 76 each of the edge portions 74 is bent outwardly and inwardly to form a groove 77 similar to the grooves 56 of the device 46.

The drawer 70 includes a flat body portion 78 rolled downwardly and inwardly at each side to form a rolled edge bead 79 which is adapted to be positioned in one of the grooves 77 of the frame and is slidable therein.

The drawer 69 is provided with a suitable handle member 80 and the tray 70 includes a handle portion 81 on the front edge intermediate the width thereof.

Mounted on the tray 70 I provide an auxiliary tray 82 which includes a flat body portion 83 having downwardly and inwardly rolled edges to form edge beads 84. The bead 84 on the left side of the tray has a plurality of spaced slots 85 therein to receive spaced upstruck lips 86 of the tray 70.

A rod 87 is positioned in the left bead 84 of the tray 82 and is positioned in suitable apertures provided in the lips 86 thus hingedly connecting the tray 82 to the tray 70.

When the device 65 is installed on the instrument panel 66 the face plate 71 engages the inner surface of the instrument panel with the body of the storage compartment positioned in the aperture 72 and the lower edge of the instrument panel preferably engages the upper edge of the drawer 69 as shown in Fig. 10. The face of the plate 71 is secured to the instrument panel 66 by a plurality of bolts 88 and nuts 89. The bolts 88 are positioned in suitable apertures provided in the instrument panel 66 and in the apertures 73 of the face plate 71.

When the tray 70 is pulled out to an extended position the auxiliary tray 82 may be swung upwardly and outwardly to the left as shown in Fig. 12 to provide a tray for a person occupying the driver's seat of the automobile.

From the foregoing description it will be apparent that I have provided a novel utility tray for use in automobiles which is simple in construction and highly efficient in use.

Having thus described my invention, I claim:

1. For mounting on an instrument panel of an automobile, a pair of spaced brackets, the opposed faces of each bracket having an upper and a lower groove, a tray member, said tray member including opposed enlarged side edges positioned in said upper grooves and slidable therein, a handle member on said tray, a drawer member, said drawer having portions thereon positioned in said lower grooves, said tray being in close proximity to the top of said drawer to form a top for said drawer, said drawer having a handle member thereon located such that said tray handle member and said drawer handle member may be simultaneously grasped with the same hand.

2. For mounting on an instrument panel of an automobile, a pair of spaced brackets each having a depending portion, the opposed faces of each depending portion having an upper and lower groove, a tray member, said tray member including opposed enlarged side edges positioned in said upper grooves and slidable therein, a handle member on said tray, a drawer member, said drawer including a bottom member extending beyond the sides of the drawer and having enlarged portions thereon positioned in said lower grooves, said drawer having a handle thereon, said tray being in close proximity to the top of said drawer to form a top for said drawer, and an adjustable spacer member positioned below said drawer and secured to each of said depending portions.

ALFRED G. BLAIR.